April 24, 1956     C. W. LAMBERT     2,743,112
OCCUPANT STEERED VEHICLE PROVIDED WITH
ALTERNATELY USEABLE WHEELS AND RUNNERS
Filed March 30, 1954     2 Sheets-Sheet 1

Charles W. Lambert
INVENTOR.

BY Clarence A. O'Brien
and Harvey B. Jacobson
Attorneys

April 24, 1956
C. W. LAMBERT
2,743,112
OCCUPANT STEERED VEHICLE PROVIDED WITH
ALTERNATELY USEABLE WHEELS AND RUNNERS
Filed March 30, 1954
2 Sheets-Sheet 2
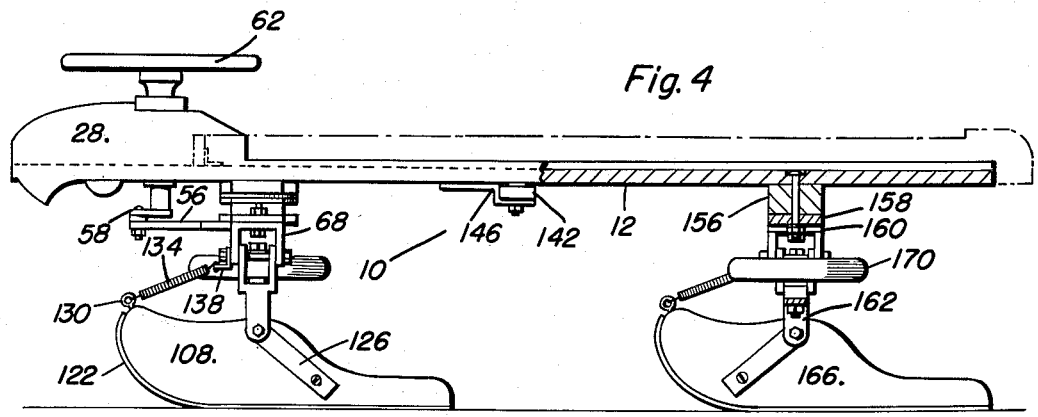
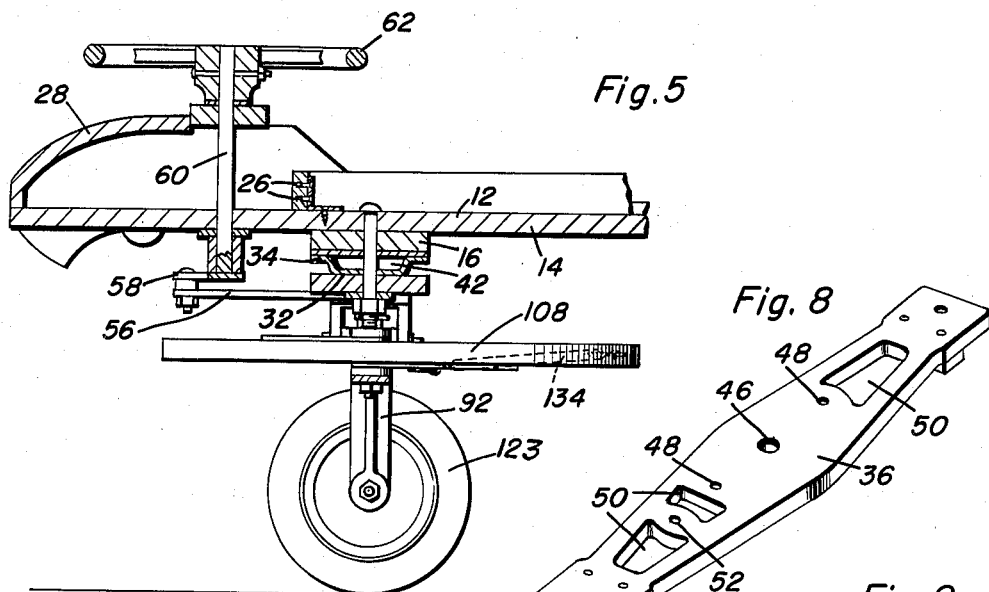
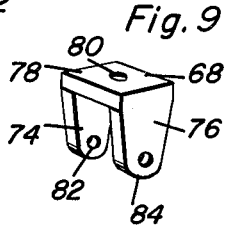
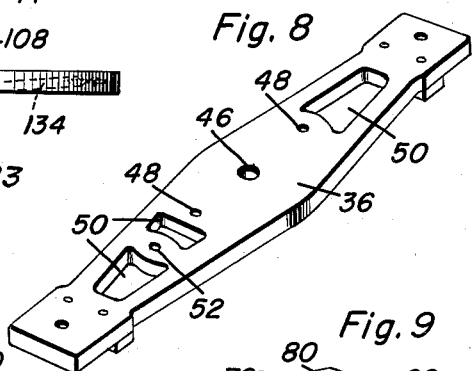
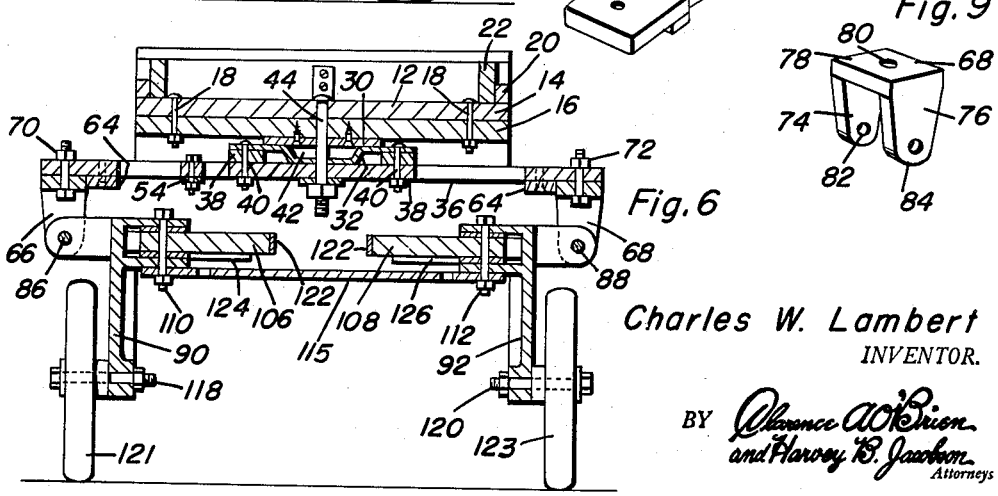
Charles W. Lambert
INVENTOR.
BY *Clarence A. O'Brien*
*and Harvey B. Jacobson*
Attorneys United States Patent Office 2,743,112
Patented Apr. 24, 1956

2,743,112

OCCUPANT STEERED VEHICLE PROVIDED WITH ALTERNATELY USEABLE WHEELS AND RUNNERS

Charles W. Lambert, Clinton, N. J.

Application March 30, 1954, Serial No. 419,661

3 Claims. (Cl. 280—9)

This invention relates to a class of toys, and more particularly to a novel combined wagon and sled.

The primary object of this invention resides in the provision of a combined wagon and sled that is an improvement over Letters Patent No. 2,185,509 to Charles W. Lambert for Toy issued January 2, 1940.

A further object of this invention resides in the provision of means for adapting sled runners and wheels in such position that the sled runners or wheels may be optionally positioned in a ground contacting arrangement with either the sled runners or the wheels being held inwardly so as to eliminate any unnecessary and perhaps dangerous projections.

A further object of this invention resides in the provision of a novel arrangement of parts for mounting sled runners so that a suitable knee action is achieved.

Yet another object of this invention resides in the provision of a novel axle and support member arrangement so that means may be provided for the toy for steering the toy whether or not the wheels or sled runners are utilized.

The construction of this invention features bifurcated support members which are rotatably mounted on the axle and adapted to be adjusted to a position whereby the wheels or sled runners may be always held inwardly of the ends of the axle thereby preventing any unnecessary projections.

Still further objects and features of this invention reside in the provision of a toy that is strong and durable, simple in construction and manufacture, capable of providing countless hours of pleasure while having utility optionally either as a wagon or sled.

These, together with the various ancillary objects and features of the invention which will become apparent as the following description proceeds are attained by this toy, a preferred embodiment of which has been illustrated in the accompanying drawings, by way of example only, wherein:

Figure 4 is a side elevational view of the toy shown with the sled runners in a ground contacting position and with parts of the invention being shown in section for greater detail;

Figure 5 is an enlarged sectional detailed view as taken along the plane of line 5—5 in Figure 3;

Figure 6 is a vertical sectional view as taken along the plane of line 6—6 in Figure 2;

Figure 8 is a perspective view of the axles utilized in this invention; and

Figure 9 is a perspective view of one of the support members which is rotatably mounted on the axle.

Figure 1:
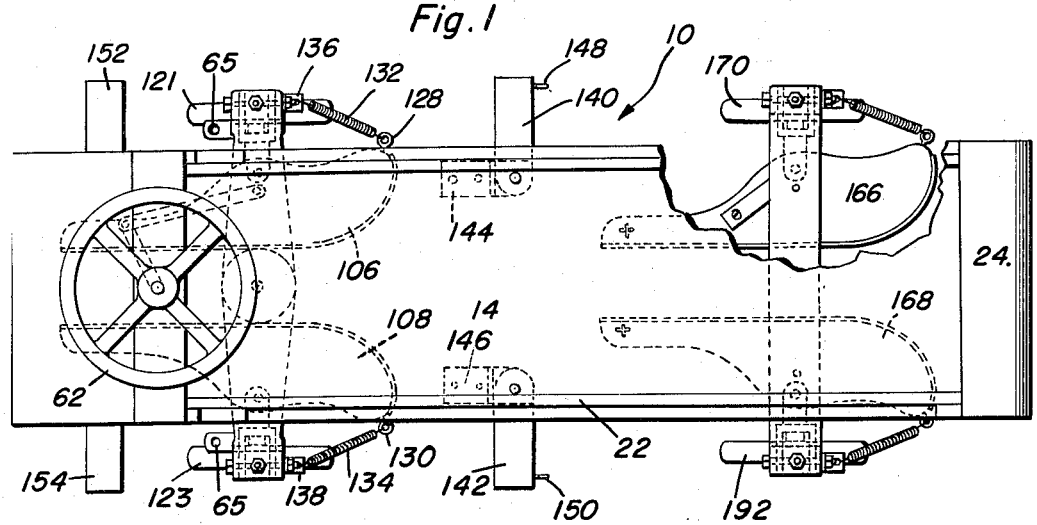
Figure 1 is a plan view of the combined wagon and sled with parts thereof being broken away to show other elements with greater clarity.

With continuing reference to the accompanying drawings wherein like reference numerals designate similar parts throughout the various views, reference numeral 10 generally designates the toy comprising the present invention. This combined wagon and sled includes a body 12 having a base 14 including bottom support strips 16 which are bolted as at 18 to the base. The base 14 has a peripheral flange 20 secured thereto which forms a stop for the removable sides 22 and rear portion 24 which is detachably secured thereon by means of suitable fasteners as at 26 inwardly of the front portion 28 of the body 12.

Secured to the bottom strip 16 is a mounting plate 30. A dish-shaped grease plate 32 having a peripheral flange 34 spaced from the axle 36 by means of spacer blocks 38 is bolted as at 40 to the axle 36. There may be positioned between the mounting plate 30 and the grease plate 32 a suitable amount of grease or other lubricant in the space 42. The axle 36 is rotatably mounted beneath the body 12 for pivotal movement by means of a bolt 44 which extends through the base 14, the bottom strip 16, the mounting plate 30, the grease plate 32, and the axle 34.

The bolt 44 extends through a centrally disposed aperture 46 in the axle 36 while bolts 40 extend through apertures 48 in the axle 36. The axle 36 may be provided with suitable lightening holes 50 of any convenient shape or size therein for reducing the weight of the axle 36 and also is provided with an aperture 52 which receives a bolt 54 holding a link 56 in a pivotal manner to the axle 36. This link 56 is attached to a crank arm 58 adapted to be rotated by a shaft 60 on which a steering wheel 62 is secured, the shaft 60 being journaled in the body 12. Thus, actuation of the steering wheel 62 will cause a pivotal and rotational movement of the axle 36.

Secured to the axle 36 are a pair of stop blocks 64 against which bifurcated support members 66 and 68 are adapted to bear. The bifurcated support members are secured to the axle 36 by means of bolts 70 and 72 in such manner that upon loosening of the bolts 70 and 72 the bifurcated support members 66 and 68 can be readily rotated and adjusted.

The bifurcated members 68 and 66, as can be best seen in Figure 9, are provided with a pair of downwardly extending portions 74 and 76 interconnected by a central connecting portion 78 apertured as at 80 for reception of the bolts 70 and 72. The downwardly extending portions 74 and 76 are also apertured as at 82 and 84.

Figure 7:
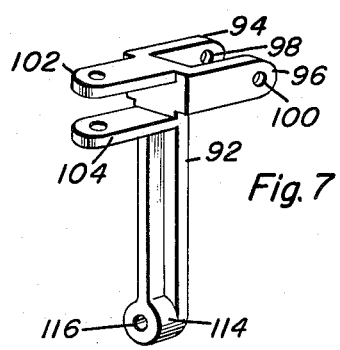
Figure 7 is a perspective view of one of the brackets comprising important elements of the present invention.

By means of suitable fasteners 86 and 88 which extend through the apertures 82 and 84 in the support members 66 and 68, a pair of brackets 90 and 92 are pivotally attached to the support members 66 and 68. The construction of the brackets 90 and 92 are identical and can be best seen in Figure 7. Each of the brackets 90 and 92 have a pair of bifurcations 94 and 96 through which the fasteners 86 and 88 are adapted to extend, the bifurcations 94 and 96 being apertured as at 98 and 100, respectively. Extending at right angles to the bifurcations 94 and 96 are a pair of spaced ears 102 and 104 adapted to retain a sled runner as at 106 and 108 therebetween utilizing bolts 110 and 112. The brackets 90 and 92 further include a stub axle portion 114 having an aperture 116 therethrough for reception of the bolts 118 and 120 provided for rotatably mounting the wheels 121 and 123.

It is to be noted that the ground engaging sled runners 106 and 108, whose construction can be best seen in Figure 4, each are provided with metal runners 122 along the bottom and front edges thereof and are further provided with reinforcing straps 124 and 126 which are bolted to the sled runners 106 and 108 and through which the bolts 110 and 112 extend. The bolts 110 and 112 also extend through a strap 115 which serves to maintain the sled runners in the raised position when the wheels 121 and 123 are in use. Eyes as at 128 and 130 are affixed to the sled runners 106 and 108 and coil springs 132 and 134 are terminally secured to the eyes 128 and 130 and to brackets 136 and 138 carried by the pins 86 and 88. The springs 132 and 134 because of the pivotal mounting of the sled runners 106 and 108 provide knee action type support for the sled runners 106 and 108.

The toy 10 further includes foot rests 140 and 142 which are pivotally attached to the body 12 and which may be held in an outer position by means of stops 144 and 146 formed by the brackets utilized in attaching the foot rests 140 and 142 to the body 12. Latches as at 148 and 150 are provided for holding the foot rests 140 and 142 in an inwardly disposed position when not in use. Other foot rests 152 and 154 may be secured to the body 12.

On the rear portions of the toy 10 there is secured by any suitable means including a mounting block as at 156, a rear axle 158 which carries a pair of spaced support members 66 and 68. Brackets as at 162 similar to the brackets 90 and 92 are pivotally attached to the support members 160 and these brackets in turn support sled runners 166 and 168 as well as wheels 170 and 172 in precisely the same manner as the sled runners 106 and 108 as well as the wheels 121 and 123 are mounted.

Figure 2:
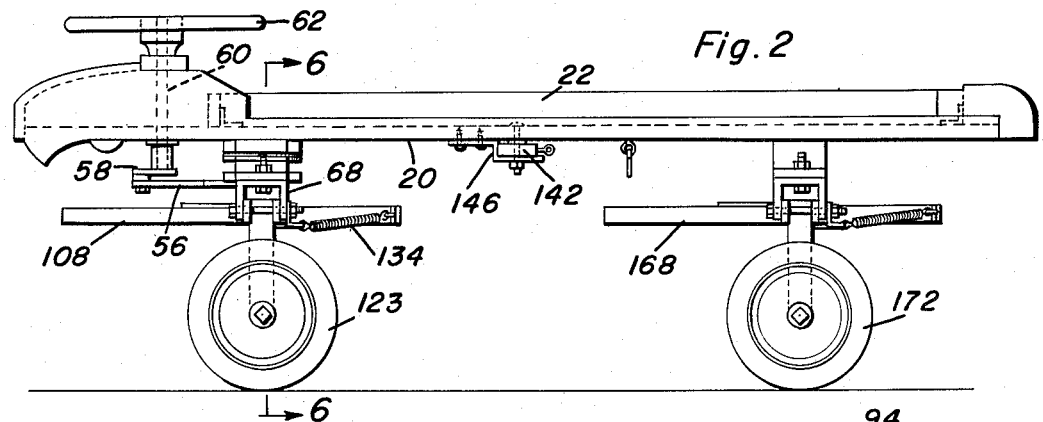
Figure 2 is a side elevational view of the device shown in position with the wheels in ground contacting position.
Figure 3:
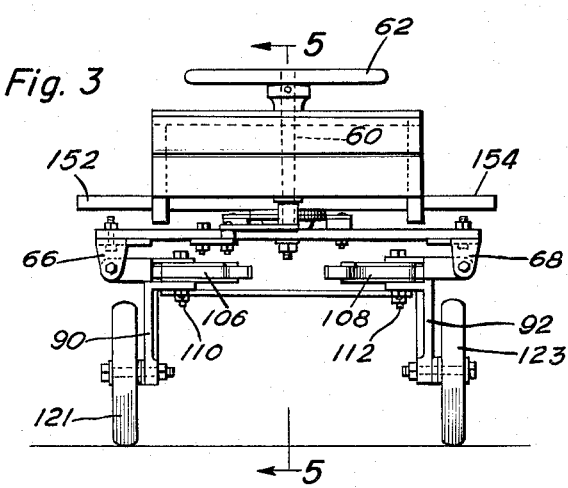
Figure 3 is a front elevational view of the invention.

In utilizing the toy as a wagon, the arrangement of parts is as shown in Figure 2 with the wheels 122, 124, 170 and 172 engaging the ground. However, when it is desired to change the wagon to a sled, it is merely necessary to remove the side members 22 as well as the rear portion 24 of the toy and then loosen the fasteners 70 and 72 as well as the fasteners holding the support members 160 in position so that the entire support members 66, 68 and the pair of support members 160 can be rotated one hundred eighty degrees. The bolts 70 and 72 as well as the other bolts holding the support members 160 in position are then tightened holding the support members rigidly against the stops as at 64. Then, it is merely necessary to rotate the brackets ninety degrees so that the sled runners are in position and the wheels raised to a position where they extend inwardly of the sled runners.

In order to provide means for pulling this toy there are provided apertures 65 in the stop blocks 64 to which a rope or tongue can be secured.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A toy comprising a body, an axle attached to said body, a pair of bifurcated support members, means adjustably securing said support members to the ends of said axle, stop members carried by said axle, said support members engaging said stop members, a pair of brackets pivotally attached to said support members between the bifurcations thereof, ground wheels and sled runners carried by said brackets, said ground wheels and said sled runners being perpendicular to each other, and a strap secured to and extending between said brackets to selectively lockingly hold said ground wheels and said sled runners in ground contacting position, said support members being rotatable one hundred eighty degrees to enable the ground wheels to be held inwardly of the sled runners when the sled runners are contacting the ground and to enable the sled runners to be held inwardly of the ground wheels when the ground wheels are contacting the ground.

2. A toy comprising a body, an axle attached to said body, a pair of bifurcated support members, means adjustably securing said support members to the ends of said axle, stop members carried by said axle, said support members engaging said stop members, a pair of brackets pivotally attached to said support members between the bifurcations thereof, ground wheels and sled runners carried by said brackets, said ground wheels and said sled runners being perpendicular to each other, and a strap secured to and extending between said brackets to selectively lockingly hold said ground wheels and said sled runners in ground contacting position, said support members being rotatable one hundred eighty degrees to enable the ground wheels to be held inwardly of the sled runners when the sled runners are contacting the ground and to enable the sled runners to be held inwardly of the ground wheels when the ground wheels are contacting the ground, said sled runners being pivotally attached to said brackets, and springs terminally secured to and extending between said support members and said sled runners.

3. A toy comprising a body, an axle attached to said body, a pair of bifurcated support members, means adjustably securing said support members to the ends of said axle, stop members carried by said axle, said support members engaging said stop members, a pair of brackets pivotally attached to said support members between the bifurcations thereof, ground wheels and sled runners carried by said brackets, said ground wheels and said sled runners being perpendicular to each other, and a strap secured to and extending between said brackets to selectively lockingly hold said ground wheels and said sled runners in ground contacting position, said support members being rotatable one hundred eighty degrees to enable the ground wheels to be held inwardly of the sled runners when the sled runners are contacting the ground and to enable the sled runners to be held inwardly of the ground wheels when the ground wheels are contacting the ground, said sled runners being pivotally attached to said brackets, and springs terminally secured to and extending between said support members and said sled runners, and a steering linkage carried by said body and pivotally attached to said axle for pivoting said axle to steer said toy.

References Cited in the file of this patent

UNITED STATES PATENTS

| | | |
|---|---|---|
| 1,302,426 | Pearson | Apr. 29, 1919 |
| 1,450,924 | Ord | Apr. 10, 1923 |
| 1,572,789 | Griffin | Feb. 9, 1926 |
| 1,642,961 | Lewis | Sept. 20, 1927 |
| 1,798,635 | Schroeder | Mar. 31, 1931 |
| 2,185,509 | Lambert | Jan. 2, 1938 |
| 2,353,501 | Redling | July 11, 1944 |
| 2,505,440 | Taber et al. | Apr. 25, 1950 |

FOREIGN PATENTS

| | | |
|---|---|---|
| 619,397 | Great Britain | Mar. 9, 1949 |
| 197,105 | Switzerland | July 1, 1938 |